US012606183B2

(12) United States Patent
Guillaume et al.

(10) Patent No.: US 12,606,183 B2
(45) Date of Patent: Apr. 21, 2026

(54) METHOD AND DEVICE FOR MONITORING AND CONTROLLING A VEHICLE ENGINE

(71) Applicant: VITESCO TECHNOLOGIES GMBH, Regensburg (DE)

(72) Inventors: Xavier Guillaume, Toulouse (FR); Jean-Luc Boyer, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 240 days.

(21) Appl. No.: 18/690,974

(22) PCT Filed: Nov. 4, 2022

(86) PCT No.: PCT/EP2022/080761
§ 371 (c)(1),
(2) Date: Mar. 11, 2024

(87) PCT Pub. No.: WO2023/083703
PCT Pub. Date: May 19, 2023

(65) Prior Publication Data
US 2024/0375669 A1 Nov. 14, 2024

(30) Foreign Application Priority Data
Nov. 10, 2021 (FR) ........................................ 2111911

(51) Int. Cl.
*B60W 50/029* (2012.01)
*B60W 10/04* (2006.01)
(Continued)

(52) U.S. Cl.
CPC .......... *B60W 50/029* (2013.01); *B60W 10/04* (2013.01); *B60W 50/045* (2013.01); *B60W 2050/0292* (2013.01); *F02D 41/26* (2013.01)

(58) Field of Classification Search
CPC ......... B60W 10/04; B60W 2050/0292; B60W 50/029; B60W 50/045; F02D 41/26;
(Continued)

(56) References Cited

U.S. PATENT DOCUMENTS 5,444,859 A * 8/1995 Baker ................. G06F 11/0724
714/704
6,499,113 B1 * 12/2002 Tobin ................... G06F 11/0772
714/E11.16
(Continued)

FOREIGN PATENT DOCUMENTS

DE 102017201032 A1 * 5/2018 .......... G06F 11/0793
DE 102017210156 A1 * 12/2018 ............ G06F 11/186
(Continued)

OTHER PUBLICATIONS

Jonas Fritzsch et al., "Experiences from Large-Scale Model Checking: Verification of a Vehicle Control System", Cornell University Library, 201 Olin Library Cornell University Ithaca, NY 14853, Nov. 20, 2020, 11 pages.
(Continued)

*Primary Examiner* — Babar Sarwar
(74) *Attorney, Agent, or Firm* — NIXON & VANDERHYE

(57) ABSTRACT

The invention relates to a method for monitoring a vehicle engine comprising an electronic engine control unit, comprising a multicore computer (C), a first module (L1), a second module (L2), and a third module (L3) that is designed to implement a safety procedure command at the request of the second module or if a failure of the first module is detected, the first module being designed to run on a first core (C1) of the computer, the second module being designed to run on a second core (C2) of the computer, the electronic engine control unit comprising a fourth module (LM) that is designed, in a redundant manner, to provide the
(Continued)

main functions for driving the engine of the vehicle, and to run under the monitoring of the second module and on the second core, the third module arbitrating between a command produced by the first module and a command produced by the fourth module.

4 Claims, 3 Drawing Sheets

(51) Int. Cl.
  B60W 50/04      (2006.01)
  F02D 41/26      (2006.01)
(58) Field of Classification Search
  CPC ............. G06F 11/0739; G06F 11/0751; G06F 11/0796; G06F 11/1489; G06F 11/1641; G06F 11/165; G06F 11/188
  See application file for complete search history.

(56)                References Cited

U.S. PATENT DOCUMENTS

| | | | | |
|---|---|---|---|---|
| 8,539,471 B2 | 9/2013 | Morton | | |
| 8,713,137 B2 | 4/2014 | Ji et al. | | |
| 8,918,778 B2 * | 12/2014 | Ayanam | .............. | G06F 11/1433 |
| | | | | 717/173 |
| 9,372,774 B2 * | 6/2016 | D'Ambrosio | ....... | G06F 11/2025 |
| 2013/0115906 A1 * | 5/2013 | Forman | .................... | H03D 7/18 |
| | | | | 455/313 |
| 2013/0268798 A1 * | 10/2013 | Schade | .............. | G06F 11/1641 |
| | | | | 714/38.1 |
| 2014/0067192 A1 * | 3/2014 | Yousuf | ............... | B60W 50/029 |
| | | | | 701/31.4 |

| | | | | |
|---|---|---|---|---|
| 2016/0046265 A1 * | 2/2016 | Heise | ..................... | G05B 15/02 |
| | | | | 701/70 |
| 2018/0105183 A1 * | 4/2018 | Kollmer | .............. | G06F 11/0739 |
| 2018/0370540 A1 * | 12/2018 | Yousuf | .................. | B60W 10/04 |
| 2021/0146938 A1 * | 5/2021 | Sari | ........................... | G06N 3/04 |
| 2021/0146939 A1 * | 5/2021 | Sari | ........................... | G01S 7/40 |
| 2021/0213837 A1 * | 7/2021 | Proietty | ............... | B60L 15/025 |

FOREIGN PATENT DOCUMENTS

| | | | | | | |
|---|---|---|---|---|---|---|
| EP | | 1577773 A1 | * | 9/2005 | .......... | G06F 11/0724 |
| EP | | 2229625 B1 | * | 8/2011 | ............ | G06F 8/654 |
| EP | | 3786021 A1 | * | 3/2021 | .......... | G06F 11/2028 |
| WO | WO-2013164224 A2 | * | 11/2013 | .......... | G06F 11/1641 |
| WO | WO-2018237121 A1 | * | 12/2018 | ........... | G06F 11/182 |
| WO | WO-2019012997 A1 | * | 1/2019 | .............. | G06F 9/52 |
| WO | WO-2021006261 A1 | * | 1/2021 | ............ | B60K 6/387 |

OTHER PUBLICATIONS

Minglu Li et al., "Fail-Operational Steer-by-Wire System for Autonomous Vehicles", 2019 IEEE International Conference on Vehicular Electronics and Safety (ICVES), Sep. 4, 2019, 6 pages.
Yaping Luo et al., "An Architecture Pattern for Safety Critical Automated Driving Applications: Design and Analysis", 2017 Annual IEEE International Systems Conference (SYSCON), Apr. 24, 2017, 7 pages.
Nägler et al., "Standardized E-Gas Monitoring Concept for Gasoline and Diesel Engine Control Units Version 6.0", Jul. 13, 2015, 57 pages, retrieved from the Internet: https://nanopdf.com/downloadFile/standardized-e-gas-monitoring-concept-for-gasoline-and_pdf.
International Search Report and Written Opinion of the ISA for PCT/EP2022/080761, mailed Dec. 14, 2022, 18 pages.

* cited by examiner

METHOD AND DEVICE FOR MONITORING AND CONTROLLING A VEHICLE ENGINE

CROSS-REFERENCE TO RELATED APPLICATIONS

This application is the U.S. national phase of International Application No. PCT/EP2022/080761 filed Nov. 4, 2022, which designated the U.S. and claims priority to FR 2111911 filed Nov. 10, 2021, the entire contents of each of which are hereby incorporated by reference.

TECHNICAL FIELD

The invention relates to the field of monitoring and controlling a vehicle engine, and more particularly the safety thereof, be this an electric, a combustion or a hybrid engine.

PRIOR ART

It is known practice to drive all of the functions, both for actually controlling and for maintaining an engine, from a monitoring and control device called an ECU (engine control unit or electronic control unit). For this purpose, as illustrated in FIG. 1, a monitoring and control device typically comprises a computer C integrated into the ECU (not shown) that combines the whole hardware component and at least one application or piece of software that runs on said computer C.

More particularly used in the automotive field, such a monitoring and control device is conventionally organized around a multicore computer C and comprises a first module L1, which is generally an application software layer and is designed, on its own, nominally and in full, to provide all the functions for driving the vehicle engine, a second module L2, which is likewise generally an application software layer and is designed to monitor the correct operation of the first module L1 and to command a safety procedure for the engine, and therefore, accordingly, for the vehicle, if a failure of the first module L1 is detected, and a third module L3, which is generally hardware, that is designed to monitor the correct operation of the computer C and to implement said safety procedure at the request of the second module L2 or if a failure is detected by its own detection means.

When the first module L1 is operating, the second module L2 thus continuously evaluates the commands produced by the first module L1 for the engine. As long as these commands are coherent, the second module L2 does not detect any failure and allows these commands to pass through to the engine. Failing that, the second module L2 detects a failure and effects a safety procedure.

A safety procedure can be effected according to at least three levels as follows:

A first level called "limp mode" allows all of the functions of the engine but imposes a maximum speed or rpm. It is therefore still possible to move the vehicle, typically to drive it to the garage to repair the failure, but at a limited speed so as to limit the risks of engine breakdown.

A second level called "stop mode" stops the engine and therefore immobilizes the vehicle. Such a safety procedure is typically commanded after the second module L2 or the third module L3 has detected a failure. The safety procedure is typically commanded by the second module L2. This command is verified and, where applicable, is repeated by the third module L3 in the event of an actuation fault.

A third level called safety "reset mode" resets the computer C. Such a safety procedure is commanded by the third module L3 either upon detection by its own means or at the request of the second module L2. The aim here is to attempt to remedy transient software errors while at the same time putting the engine and the vehicle into a safe state.

Such a structure of known type is, for example, described in documents EP1577773A1 and WO2013164224.

Such an approach results in excessive favoring of immobilization of the vehicle, even though a certain amount of mobility could be retained in some cases. The present application aims to overcome at least some of these drawbacks.

SUMMARY OF THE INVENTION

For this purpose, the invention relates to a method for monitoring and controlling a vehicle engine implemented in an electronic engine control unit, comprising a multicore computer C, a first module L1 that is designed, on its own, nominally and in full, to provide the functions for driving the engine of the vehicle, a second module L2 that is designed to monitor the correct operation of the first module L1 and to command a safety procedure if a failure of the first module L1 is detected, and a third module L3 that is designed to monitor the correct operation of the multicore computer C and to implement said safety procedure command at the request of the second module L2 or if a failure of the first module L1 is detected by its own means.

The method according to the invention is noteworthy in that the first module L1 is able to run on a first core C1 of the multicore computer C, in that the second module L2 is able to run on a second core C2 of the multicore computer C that is different to the first core C1, in that the electronic engine control unit comprises a fourth module LM that is designed, in a redundant and simplified manner, to provide the main functions for driving the engine of the vehicle, and is furthermore designed to run in connection with the second module L2 and on the second core C2, the third module L3 arbitrating between a command produced by the first module L1 and a command produced by the fourth module LM. Running "in connection with the second module L2" means running under the monitoring of the second module L2. Provision is preferably made, in the (soft) code of the fourth module LM, for control points that allow the second module L2 to verify whether the code is running in the correct order and/or according to a desired timing. Preferably, running in connection with the second module L2 entails running with the same operational safety criteria as the second module L2.

According to the invention, the arbitration between a command produced by the first module L1 and a command produced by the fourth module LM comprises the following steps:

evaluation of a first condition T1: a command produced by the first module L1 is close to, or equal to, a command produced by the fourth module LM, evaluation of a second condition T2: the monitoring of the second module L2 by the third module L3 has not detected any error, if the first condition T1 and the second condition T2 are both true, the command produced by the first module L1 is applied to the engine, if the first condition T1 is false and the second condition T2 is true, the command produced by the fourth module LM is applied to the engine, if the first condition T1 is false and the second condition T2 is false, a safety procedure is commanded, if the first condition T1 is true and the second condition T2 is false, a safety procedure is commanded.

According to one advantageous embodiment, the first module L1 is implemented by an application software layer, the second module L2 is implemented by an application software layer, the third module L3 is implemented by a hardware module, and the fourth module LM is implemented by an application software layer.

The present invention furthermore relates to an electronic unit for monitoring and controlling a vehicle engine, comprising a multicore computer C, a first module L1 that is designed, on its own, nominally and in full, to provide the functions for driving the engine of the vehicle, a second module L2 that is designed to monitor the correct operation of the first module L1 and to command a safety procedure if a failure of the first module L1 is detected, and a third module L3 that is designed to monitor the correct operation of the multicore computer C and to implement said safety procedure command at the request of the second module L2 or if a failure of the first module L1 is detected by its own means, characterized in that the first module L1 is able to run on a first core C1 of the multicore computer C, in that the second module L2 is able to run on a second core C2 of the multicore computer C that is different to the first core C1, and in that the electronic engine control unit comprises a fourth module LM that is designed, in a redundant and simplified manner, to provide the main functions for driving the engine of the vehicle, and is furthermore designed to run in connection with the second module L2 and on the second core C2, the third module L3 arbitrating between a command produced by the first module L1 and a command produced by the fourth module LM.

According to one advantageous feature of the electronic monitoring and control unit according to the invention, the first module L1 is a software layer, the second module L2 is a software layer, the third module L3 is a hardware module, and the fourth module LM is a software layer.

BRIEF DESCRIPTION OF THE DRAWINGS

The invention will be understood better from reading the following description, given solely by way of example, with reference to the appended figures, in which.

DESCRIPTION OF THE EMBODIMENTS

Figure 1:
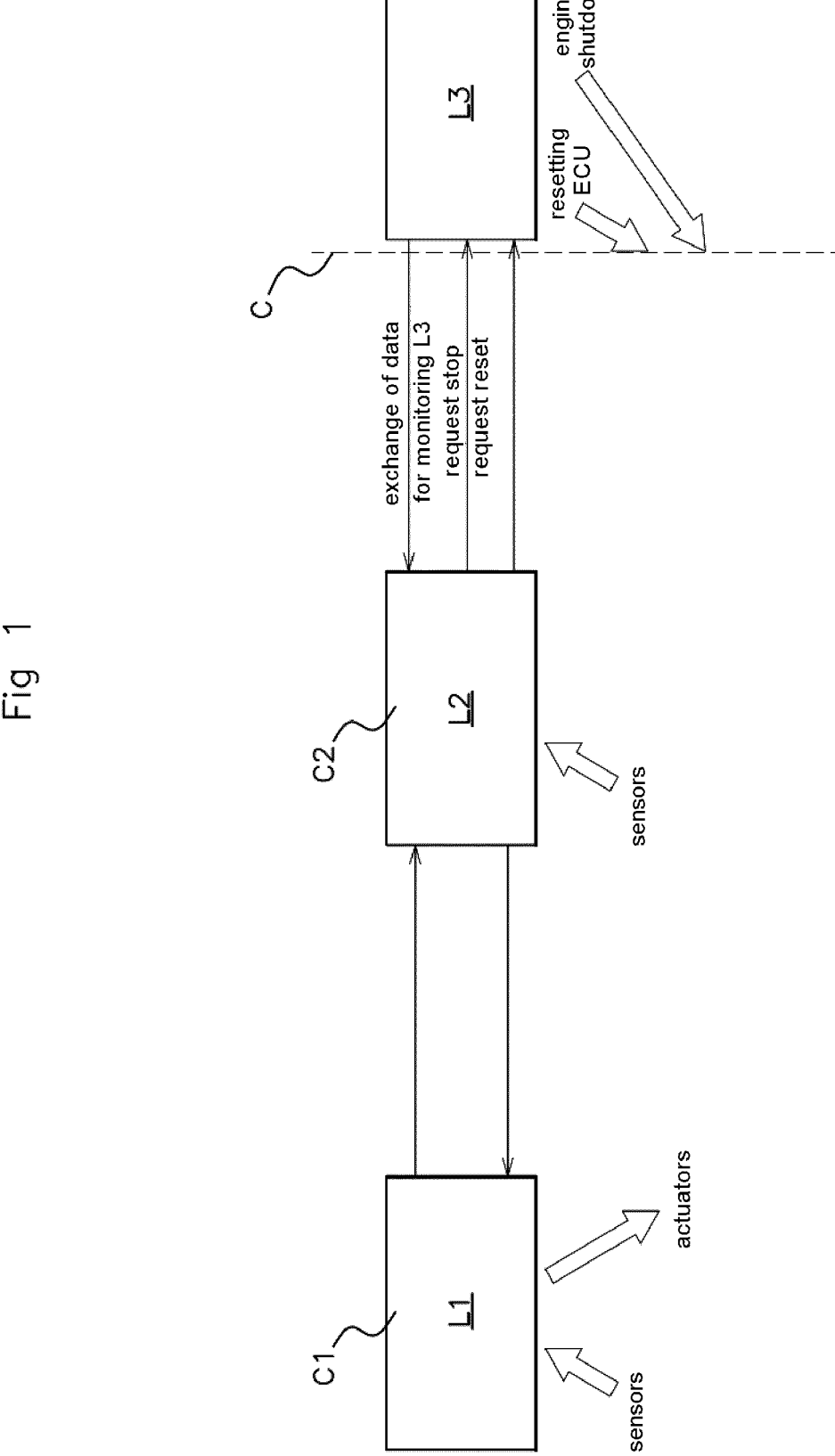
FIG. 1 schematically illustrates an arrangement of three modules L1, L2, L3 according to the prior art, FIG. 2 schematically illustrates an arrangement of three modules L1, L2, L3 that is expanded according to the invention, FIG. 3 schematically illustrates the arbitration between L1 and LM.

With reference to FIG. 1, which is illustrative of the prior art, a device for monitoring and controlling a vehicle engine, which complies, for example, with the ISO 26262 standard known by those skilled in the art, comprises a multicore computer C (not shown), a first module L1, for example an application software module L1 that is designed to run on a first core C1 of the computer C and, on its own, nominally and in full, to provide all the functions for driving the engine of the vehicle, a second module L2, for example an application software module L2 that is designed to run on a second core C2 that is different to the first core C1 and is designed to monitor the correct operation of the first application module L1 and to command a safety procedure if a failure of the first application module L1 is detected, and a third module L3, for example a hardware module L3, that is able to monitor the correct operation of the computer C and to implement said safety procedure at the request of the second application module L2 or upon detection by its own means.

For the present description, a safety procedure has the same definition as that given above for the prior art, that is to say can be effected according to at least three levels, summarized as follows:

A first level called "limp mode" allows all of the functions of the engine but imposes a maximum speed or rpm.

A second level called "stop mode" stops the engine and therefore immobilizes the vehicle. Such a safety procedure is typically commanded after the second module L2 or the third module L3 has detected a failure. The safety procedure is typically commanded by the second module L2. This command is verified and, where applicable, is repeated by the third module L3 in the event of an actuation fault.

A third level called safety "reset mode" resets the computer C. Such a safety procedure is commanded by the third module L3 either upon detection by its own means or at the request of the second module L2. The aim here is to attempt to remedy transient software errors while at the same time putting the engine and the vehicle into a safe state.

Figure 2:
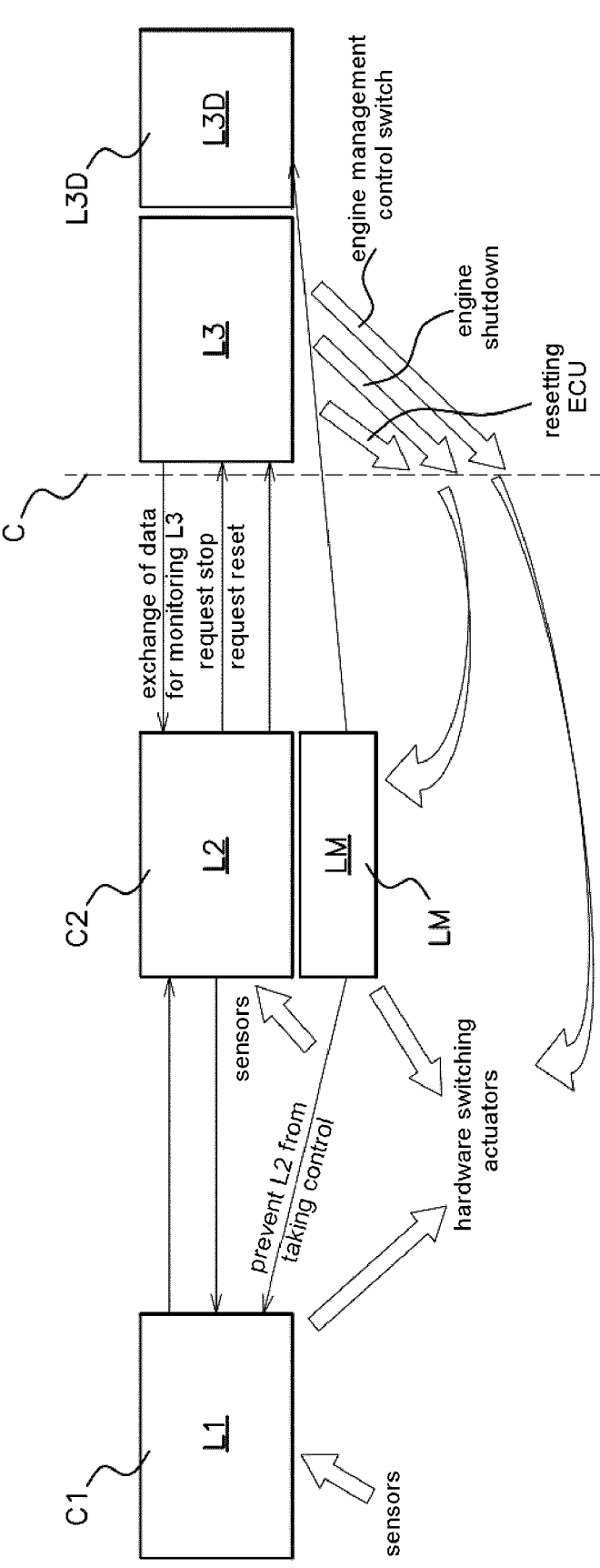

Furthermore, as illustrated in FIG. 2, the invention adds a fourth module LM. This new fourth module LM is able, in a redundant manner in relation to the first application software module L1, and in a simplified manner, to provide the main functions for driving the engine of the vehicle.

Here, the term "simplified" is understood to mean that only the main functions are undertaken. The engine control algorithm will be simpler, to the detriment of performance. For example, fewer adjustable parameters will be used (fewer calibrations), again to the detriment of performance. In a combustion engine, it will be possible, for example, to remove a certain number of injection strategies (regeneration, multi-injection, etc.) as is already known and carried out in "limp home" mode, a MIL (malfunction indicator lamp) warning light imperatively having to be turned on so that the driver quickly takes the vehicle to the garage. Furthermore, each of the retained functions is not necessarily developed with the same level of detail as in the first application software module L1, but only so as to be able to control the engine. The simplification of the strategy implemented by the fourth module LM makes it possible to circumvent a potential problem that would be implemented in the first module L1. This simplification avoids having the same software bug and above all consumes fewer data and puts less load on the computer. This strategy runs on another core of the multicore computer of the electronic engine control unit in a safe environment of ISO 26262 type that is, for example, known by those skilled in the art.

The term "redundant" is understood to mean that the fourth module LM is able to produce engine commands that are redundant in relation to those produced by the first application software module L1.

The fourth module LM is, for example, an application software module, and in the interest of operational safety is able to run in connection with the second application software module L2 and on the second core C2. The redundant fourth module LM therefore advantageously does not run on the same core C1 as the first application L1.

The invention also adds an arbitration module L3D. This arbitration module L3D is integrated into the third hardware module L3 and therefore allows it to provide the arbitration.

The function of the arbitration module L3D consists either of choosing, from the engine commands redundantly produced by the first application software module L1, on the one hand, and by the fourth module LM, on the other hand, those which seem the most reliable, have to be retained and are applied effectively to the engine, or if there is no arbitration, when such a choice proves to be dangerous, of not applying a command and instead requesting a safety procedure.

Figure 3:
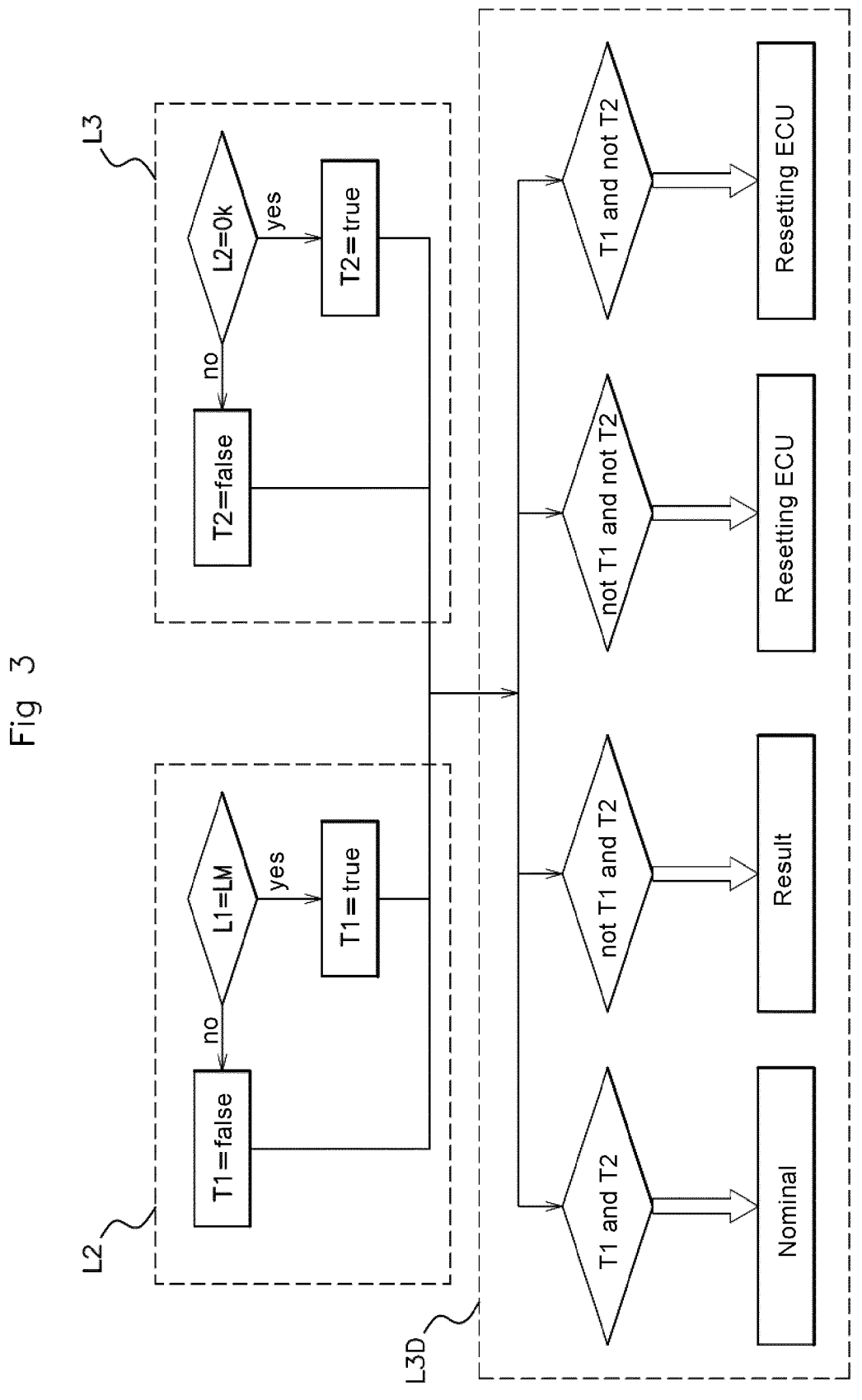

According to another feature, the arbitration between a command produced by the first application software module L1 and a command produced by the fourth module LM is carried out according to the following synopsis, more particularly illustrated in FIG. 3.

This synopsis comprises, more particularly illustrated in the top part of FIG. 3, the following steps: evaluation of a first condition T1 by the second application software module L2 and evaluation of a second condition T2 by the third hardware module L3.

This first condition T1 is true if a command produced by the first application software module L1 is close to, or equal to, a command produced by the fourth application software module LM, which is represented by the conditional box L1=LM in FIG. 3. The expression "close to" used above with regard to the comparison of commands will be defined here by two corresponding data values having a negligible difference from the system effect point of view. This difference is to be quantified by calibration for each datum. Advantageously for logic signals, the first condition T1 is true when a command produced by the first application software module L1 is equal to a command produced by the fourth application software module LM. Preferably, for analog signals, the first condition T1 is true when a command produced by the first application software module L1 is equal to a command produced by the fourth application software module LM, to within a few percent, for example less than 5%, the exact threshold having to be adapted to the system by calibration.

Otherwise, T1 is false as indicated. The second application module L2 is responsible for comparing L1 against LM and processes the first condition T1.

The second condition T2 is true if the monitoring of the second application software module L2 by the third hardware module L3 has not detected any error, that is to say that the second application software module L2 is operating correctly because the third hardware module L3 has not detected an error on its part (for example memory access violation, scheduling and timing of the processes, etc.), which is shown in FIG. 3 by the conditional box L2=OK. Otherwise, T2 is false as indicated. The third hardware module L3 is responsible for monitoring the second application module L2 and processes the second condition T2.

Then, depending on the values of the two conditions T1 and T2, a plurality of cases are possible, as shown in the bottom part of FIG. 3. These cases are managed by the arbitration module L3D, which is responsible for making decisions according to the four possible conditions between T1 and T2, as described below.

Now, therefore, more particularly with reference to the bottom part of FIG. 3, according to a first case, if T1 and T2 are both true, this therefore gives T1 AND T2, as shown at the bottom left of FIG. 3, the monitoring/control is in a nominal case as indicated. The first application software module L1 produces an engine command that is substantially identical to an engine command produced by the fourth application software module LM. Furthermore, the monitoring of the first application software module L1 by the second application software module L2 has not detected any error. The engine command resulting from one or the other of the redundant modules can therefore be applied to the engine. The command produced by the first application software module L1 is preferred and is applied to the engine.

According to a second case, still with reference to FIG. 3, if T1 is false and T2 is true, as shown in FIG. 3 in the second box from the left at the bottom, that is to say if NOT T1 AND T2, the monitoring/control is in a degraded case. Here, the two redundant commands are divergent. However, the fourth application software module LM is trusted, whereas the first application software module L1 is considered to be defective. The command produced by the fourth application software module LM is therefore applied to the engine. A warning light can advantageously be displayed on the dashboard of the vehicle, aiming to inform the driver, for example by the warning light called the MIL (malfunction indicator lamp) turning on. The second case NOT T1 AND T2 can reflect, for example, a failure of the first module L1.

According to a third case, still with reference to FIG. 3, if T1 and T2 are both false, this therefore gives NOT T1 and NOT T2, as shown in the third box from the left at the bottom in FIG. 3, and the two redundant commands diverge. The second module L2 is no longer trusted, it is not possible to continue running the software and it is necessary to restart the computer C. It is considered here that it is not possible to carry out arbitration. A safety procedure is therefore commanded by resetting the ECU.

According to a fourth case, still with reference to FIG. 3, if T1 is true and T2 is false, as shown in FIG. 3 in the fourth box from the left at the bottom, that is to say if T1 AND NOT T2, the second module L2 is no longer trusted, it is not possible to continue running the software and it is necessary to restart the computer C. It is also considered here that it is not possible to carry out arbitration. A safety procedure is therefore commanded by resetting the ECU. The fourth case T1 AND NOT T2 can reflect, for example, a failure of the hardware power driver.

The invention adds, in relation to the prior art, the second case as described above, in which a certain amount of mobility is possible, which makes it possible, for example, to mobilize the vehicle to a garage for repair, whereas a safety procedure with immobilization would have been imposed according to the prior art.

The invention has been illustrated and described in detail in the drawings and the preceding description. The latter should be considered to be illustrative and given by way of example and not to limit the invention just to this description. Numerous embodiment variants are possible.

The invention claimed is:

1. A method for monitoring and controlling a vehicle engine implemented in an electronic engine control unit comprising a memory, comprising:

a multicore computer (C), a first module (L1) that is designed, on its own, nominally and in full, to provide functions for driving the engine of the vehicle, a second module (L2) that is designed to monitor correct operation of the first module (L1) and to command a safety procedure when a failure of the first module (L1) is detected, and a third module (L3) that is designed to monitor correct operation of the multicore computer (C) and to implement said safety procedure command at request of the second module (L2) or when a failure of the first module (L1) is detected by its own means, wherein:

the first module (L1) is designed to run on a first core (C1) of the multicore computer (C),

the second module (L2) is designed to run on a second
core (C2) of the multicore computer (C) that is different
to the first core (C1), the electronic engine control unit comprises a fourth
module (LM) that is designed, in a redundant and
simplified manner, to provide main functions for driv-
ing the engine of the vehicle, and is furthermore
designed to run under the monitoring of the second
module (L2) and on the second core (C2), the third
module (L3) arbitrating between a command produced
by the first module (L1) and a command produced by
the fourth module (LM);

and in that the arbitration between the command produced
by the first module (L1) and the command produced by
the fourth module (LM) comprises the following steps:

evaluating a first condition (T1): determining whether the
command produced by the first module (L1) is close to,
or equal to, the command produced by the fourth
module (LM), evaluating a second condition (T2): determining whether
the monitoring of the second module (L2) by the third
module (L3) has not detected any error, when the first condition (T1) and the second condition
(T2) are both true, applying the command produced by
the first module (L1) to the engine, when the first condition (T1) is false and the second
condition (T2) is true, applying the command produced
by the fourth module (LM) to the engine, when the first condition (T1) is false and the second
condition (T2) is false, commanding the safety proce-
dure, and when the first condition (T1) is true and the
second condition (T2) is false, commanding the safety
procedure; and controlling the vehicle engine based on the safety proce-
dure.

2. The monitoring and control method as claimed in claim
1, wherein the first module (L1) is implemented by an
application software layer, the second module (L2) is imple-
mented by an application software layer, the third module
(L3) is implemented by a hardware module, and the fourth
module (LM) is implemented by an application software
layer.

3. An electronic engine control unit comprising a memory,
the electronic engine control unit being configured for
monitoring and controlling a vehicle engine, comprising:

a multicore computer (C), a first module (L1) that is designed, on its own, nominally
and in full, to provide functions for driving the engine
of the vehicle, a second module (L2) that is designed to monitor correct
operation of the first module (L1) and to command a
safety procedure when a failure of the first module (L1)
is detected, and

8 a third module (L3) that is designed to monitor correct
operation of the multicore computer (C) and to imple-
ment said safety procedure command at request of the
second module (L2) or when a failure of the first
module (L1) is detected by its own means, wherein:

the first module (L1) is designed to run on a first core (C1)
of the multicore computer (C), the second module (L2) is designed to run on a second
core (C2) of the multicore computer (C) that is different
to the first core (C1), the electronic engine control unit comprises a fourth
module (LM) that is designed, in a redundant and
simplified manner, to provide main functions for driv-
ing the engine of the vehicle, and is furthermore
designed to run under the monitoring of the second
module (L2) and on the second core (C2), the third
module (L3) arbitrating between a command produced
by the first module (L1) and a command produced by
the fourth module (LM), and in that the third module (L3) is configured so that the
arbitration between the command produced by the first
module (L1) and the command produced by the fourth
module (LM) comprises the following steps:

evaluating a first condition (T1): determining whether the
command produced by the first module (L1) is close to,
or equal to, the command produced by the fourth
module (LM), evaluating a second condition (T2): determining whether
the monitoring of the second module (L2) by the third
module (L3) has not detected any error, when the first condition (T1) and the second condition
(T2) are both true, applying the command produced by
the first module (L1) to the engine, when the first condition (T1) is false and the second
condition (T2) is true, applying the command produced
by the fourth module (LM) to the engine, when the first condition (T1) is false and the second
condition (T2) is false, commanding the safety proce-
dure, and when the first condition (T1) is true and the
second condition (T2) is false, commanding the safety
procedure; and controlling the vehicle engine based on the safety proce-
dure.

4. The monitoring and control unit as claimed in claim 3,
wherein the first module (L1) is a software layer, the second
module (L2) is a software layer, the third module (L3) is a
hardware module, and the fourth module (LM) is a software
layer.

* * * * *